US012787039B2

(12) United States Patent
Kadiri et al.

(10) Patent No.: US 12,787,039 B2
(45) Date of Patent: Nov. 3, 2026

(54) HYBRID MULTICAST AND BROADCAST

(71) Applicant: QUALCOMM Incorporated, San Diego, CA (US)

(72) Inventors: Prasad Reddy Kadiri, San Diego, CA (US); Alberto Rico Alvarino, San Diego, CA (US); Miguel Griot, La Jolla, CA (US); Xipeng Zhu, San Diego, CA (US); Haris Zisimopoulos, London (GB); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 18/685,755

(22) PCT Filed: Sep. 6, 2022

(86) PCT No.: PCT/US2022/075972

§ 371 (c)(1),
(2) Date: Feb. 22, 2024

(87) PCT Pub. No.: WO2023/064653

PCT Pub. Date: Apr. 20, 2023

(65) Prior Publication Data

US 2024/0357622 A1 Oct. 24, 2024

(30) Foreign Application Priority Data

Oct. 15, 2021 (GR) .............................. 20210100705

(51) Int. Cl.
*H04W 72/30* (2023.01)
*H04W 76/40* (2018.01)

(52) U.S. Cl.
CPC .......... *H04W 72/30* (2023.01); *H04W 76/40* (2018.02)

(58) Field of Classification Search
CPC ....... H04W 72/30; H04W 4/06; H04W 76/40; H04W 24/08; H04W 48/16; H04W 48/18
See application file for complete search history.

(56) References Cited

U.S. PATENT DOCUMENTS 8,514,824 B2 * 8/2013 Fernandes ............ H04N 21/647 709/227
10,187,220 B2 1/2019 Pazos et al.
(Continued)

FOREIGN PATENT DOCUMENTS

CN 101820585 A * 9/2010
CN 105052159 A * 11/2015 ............. H04L 69/08
(Continued)

OTHER PUBLICATIONS

3GPP TR 23.757: "3rd Generation Partnership Project, Technical Specification Group Services and System Aspects, Study on Architectural Enhancements for 5G Multicast-Broadcast Services (Release 17)", 3GPP Standard, Technical Report, 3GPP, Mobile Competence Centre, 650, Route Des Lucioles, F-06921 Sophia-Antipolis Cedex, France, vol. SA WG2, No. V17.0.0, Mar. 31, 2021, 297 Pages, XP052000263, Chapters 6.3, 6.6, 6.13, 6.21, 6.28, 6.38 and 6.39.
(Continued)

*Primary Examiner* — Shean Tokuta
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area. The UE may receive information associated with the service using one of the multicast mode or the broadcast mode. The
(Continued)

UE may switch to receiving information associated with the service using the other of the multicast mode or the broadcast mode based at least in part on the first set of one or more parameters or the second set of one or more parameters. Numerous other aspects are described.

29 Claims, 10 Drawing Sheets

(56) References Cited

U.S. PATENT DOCUMENTS 12,114,210 B2* 10/2024 Li ........................... H04W 4/08
12,213,031 B2* 1/2025 Xu ........................... H04W 4/06
12,538,185 B2* 1/2026 Li ........................... H04W 4/06
2006/0154627 A1* 7/2006 Wang .................... H04L 12/189 455/434
2012/0269075 A1* 10/2012 Fernandes ......... H04W 36/0007 370/252
2013/0107721 A1* 5/2013 Wang .................... H04W 72/30 370/241
2022/0053456 A1* 2/2022 Lei ........................ H04W 72/30
2022/0377507 A1 11/2022 Xie et al.
2023/0345310 A1* 10/2023 Li ........................... H04W 4/06
2024/0357622 A1* 10/2024 Kadiri ................... H04W 48/16
2024/0365178 A1* 10/2024 Li ........................... H04W 4/06
2025/0133578 A1* 4/2025 Pham Van ............ H04L 12/189
2025/0175817 A1* 5/2025 Zisimopoulos ......... H04W 4/06
2025/0358892 A1* 11/2025 Fujishiro ............... H04W 76/27

FOREIGN PATENT DOCUMENTS

CN 107147923 A * 9/2017 ......... H04N 21/6405
CN 107734464 A * 2/2018 ............ H04W 72/30
CN 110087105 A * 8/2019 ....... H04N 21/26208
CN 118509958 A * 8/2024 ........ H04W 52/0261
JP 2001332913 A * 11/2001
KR 20210104562 A * 8/2021 .............. H04W 4/06
WO WO-2021032058 A1 * 2/2021 ............ H04W 72/23
WO WO-2021162315 A1 * 8/2021 ........ H04W 28/0268
WO WO-2021162333 A1 * 8/2021 ............ H04W 76/40
WO WO-2021163260 A1 * 8/2021 ............ H04W 76/12
WO WO-2021164564 A1 * 8/2021 ......... H04N 21/6408
WO WO-2021164763 A1 8/2021
WO WO-2022242409 A1 * 11/2022 .............. H04W 4/12
WO WO-2023064653 A1 * 4/2023 ............ H04W 76/40
WO WO-2023215039 A1 * 11/2023 ............ H04W 72/12

OTHER PUBLICATIONS

International Search Report and Written Opinion—PCT/US2022/075972—ISA/EPO—Dec. 14, 2022.

* cited by examiner

HYBRID MULTICAST AND BROADCAST

CROSS-REFERENCE TO RELATED APPLICATIONAPPLICATIONS

This Patent Application is a 371 national stage of PCT Application No. PCT/US2022/075972 filed on Sep. 6, 2022, entitled "HYBRID MULTICAST AND BROADCAST," which claims priority to Greece patent application Ser. No. 20/210,100705, filed on Oct. 15, 2021, entitled "HYBRID MULTICAST AND BROADCAST," and assigned to the assignee hereof. The disclosure of the prior Applications are considered part of and are incorporated by reference in this Patent Application.

FIELD OF THE DISCLOSURE

Aspects of the present disclosure generally relate to wireless communication and to techniques and apparatuses for hybrid multicast and broadcast.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area. The method may include receiving information associated with the service using one of the multicast mode or the broadcast mode based at least in part on the first set of one or more parameters or the second set of one or more parameters. The method may include switching to receiving information associated with the service using the other of the multicast mode or the broadcast mode based at least in part on the first set of one or more parameters or the second set of one or more parameters.

Some aspects described herein relate to a method of wireless communication performed by a network node. The method may include transmitting a configuration associated with a service, the configuration indicating a first set of one or more parameters for accessing the service in a multicast mode using NAS-based signaling, and a second set of one or more parameters for accessing the service in a broadcast mode within a broadcast service area. The method may include transmitting information associated with the service using the multicast mode. The method may include transmitting information associated with the service using the broadcast mode.

Some aspects described herein relate to an apparatus for wireless communication performed by a UE. The apparatus may include a memory and one or more processors, coupled to the memory. The one or more processors may be configured to receive a configuration associated with a service, the configuration indicating a first set of one or more parameters for accessing the service in a multicast mode using NAS-based signaling, and a second set of one or more parameters for accessing the service in a broadcast mode within a broadcast service area. The one or more processors may be configured to receive information associated with the service using one of the multicast mode or the broadcast mode based at least in part on the first set of one or more parameters or the second set of one or more parameters. The one or more processors may be configured to switch to receiving information associated with the service using the other of the multicast mode or the broadcast mode based at least in part on the first set of one or more parameters or the second set of one or more parameters.

Some aspects described herein relate to an apparatus for wireless communication performed by a network node. The apparatus may include a memory and one or more processors, coupled to the memory. The one or more processors may be configured to transmit a configuration associated with a service, the configuration indicating a first set of one or more parameters for accessing the service in a multicast mode using NAS-based signaling, and a second set of one or more parameters for accessing the service in a broadcast mode within a broadcast service area. The one or more processors may be configured to transmit information associated with the service using the multicast mode. The one or more processors may be configured to transmitting information associated with the service using the broadcast mode.

Some aspects described herein relate to a non-transitory computer-readable medium that stores a set of instructions for wireless communication by a UE. The set of instructions, when executed by one or more processors of the UE, may cause the UE to receive a configuration associated with a service, the configuration indicating a first set of one or more parameters for accessing the service in a multicast mode using NAS-based signaling, and a second set of one or more parameters for accessing the service in a broadcast mode within a broadcast service area. The set of instructions, when executed by one or more processors of the UE, may cause the UE to receive information associated with the service using one of the multicast mode or the broadcast mode based at least in part on the first set of one or more parameters or the second set of one or more parameters. The set of instructions, when executed by one or more processors of the UE, may cause the UE to switch to receiving information associated with the service using the other of the multicast mode or the broadcast mode based at least in part on the first set of one or more parameters or the second set of one or more parameters.

Some aspects described herein relate to a non-transitory computer-readable medium that stores a set of instructions for wireless communication by a network node. The set of instructions, when executed by one or more processors of the network node, may cause the network node to transmit a configuration associated with a service, the configuration indicating a first set of one or more parameters for accessing the service in a multicast mode using NAS-based signaling, and a second set of one or more parameters for accessing the service in a broadcast mode within a broadcast service area. The set of instructions, when executed by one or more processors of the network node, may cause the network node to transmit information associated with the service using the multicast mode. The set of instructions, when executed by one or more processors of the network node, may cause the network node to transmit information associated with the service using the broadcast mode.

Some aspects described herein relate to an apparatus for wireless communication. The apparatus may include means for receiving a configuration associated with a service, the configuration indicating a first set of one or more parameters for accessing the service in a multicast mode using NAS-based signaling, and a second set of one or more parameters for accessing the service in a broadcast mode within a broadcast service area. The apparatus may include means for receiving information associated with the service using one of the multicast mode or the broadcast mode based at least in part on the first set of one or more parameters or the second set of one or more parameters. The apparatus may include means for switching to receiving information associated with the service using the other of the multicast mode or the broadcast mode based at least in part on the first set of one or more parameters or the second set of one or more parameters.

Some aspects described herein relate to an apparatus for wireless communication. The apparatus may include means for transmitting a configuration associated with a service, the configuration indicating a first set of one or more parameters for accessing the service in a multicast mode using NAS-based signaling, and a second set of one or more parameters for accessing the service in a broadcast mode within a broadcast service area. The apparatus may include means for transmitting information associated with the service using the multicast mode. The apparatus may include means for transmitting information associated with the service using the broadcast mode.

Aspects generally include a method, apparatus, system, computer program product, non-transitory computer-readable medium, user equipment, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
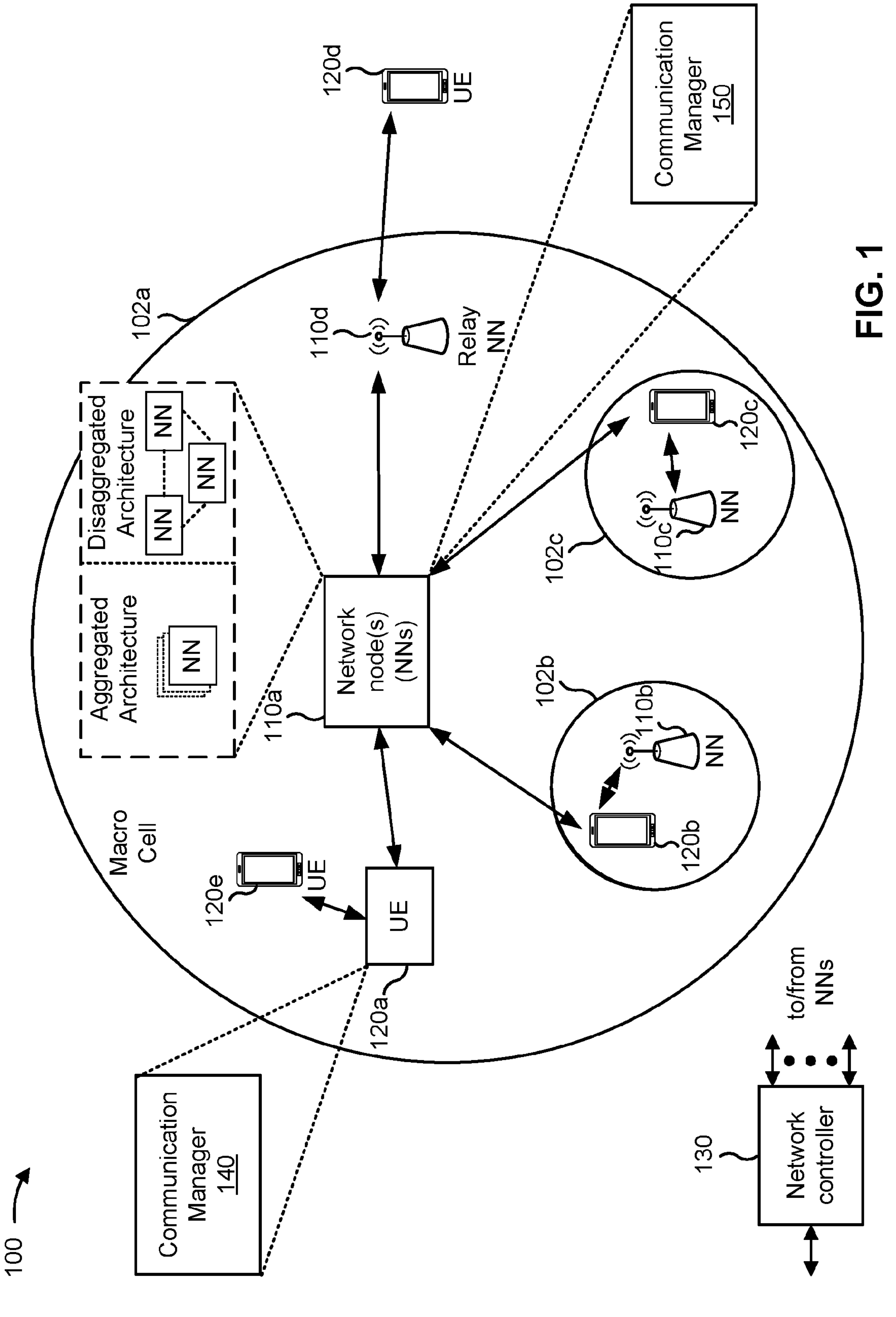
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area; receive information associated with the service using one of the multicast mode or the broadcast mode based at least in part on the first set of one or more parameters or the second set of one or more parameters; and switch to receiving information associated with the service using the other of the multicast mode or the broadcast mode based at least in part on the first set of one or more parameters or the second set of one or more parameters. Additionally, or alternatively, the communication manager 140 may perform one or more other operations described herein.

In some aspects, the network node 110 may include a communication manager 150. As described in more detail elsewhere herein, the communication manager 150 may transmit a configuration associated with a service, the configuration indicating a first set of one or more parameters for accessing the service in a multicast mode using NAS-based signaling, and a second set of one or more parameters for accessing the service in a broadcast mode within a broadcast service area; transmit information associated with the service using the multicast mode; and transmit information associated with the service using the broadcast mode. Additionally, or alternatively, the communication manager 150 may perform one or more other operations described herein.

As indicated above, FIG. 1 is provided as an example. Other examples may differ from what is described with regard to FIG. 1.

Figure 2:
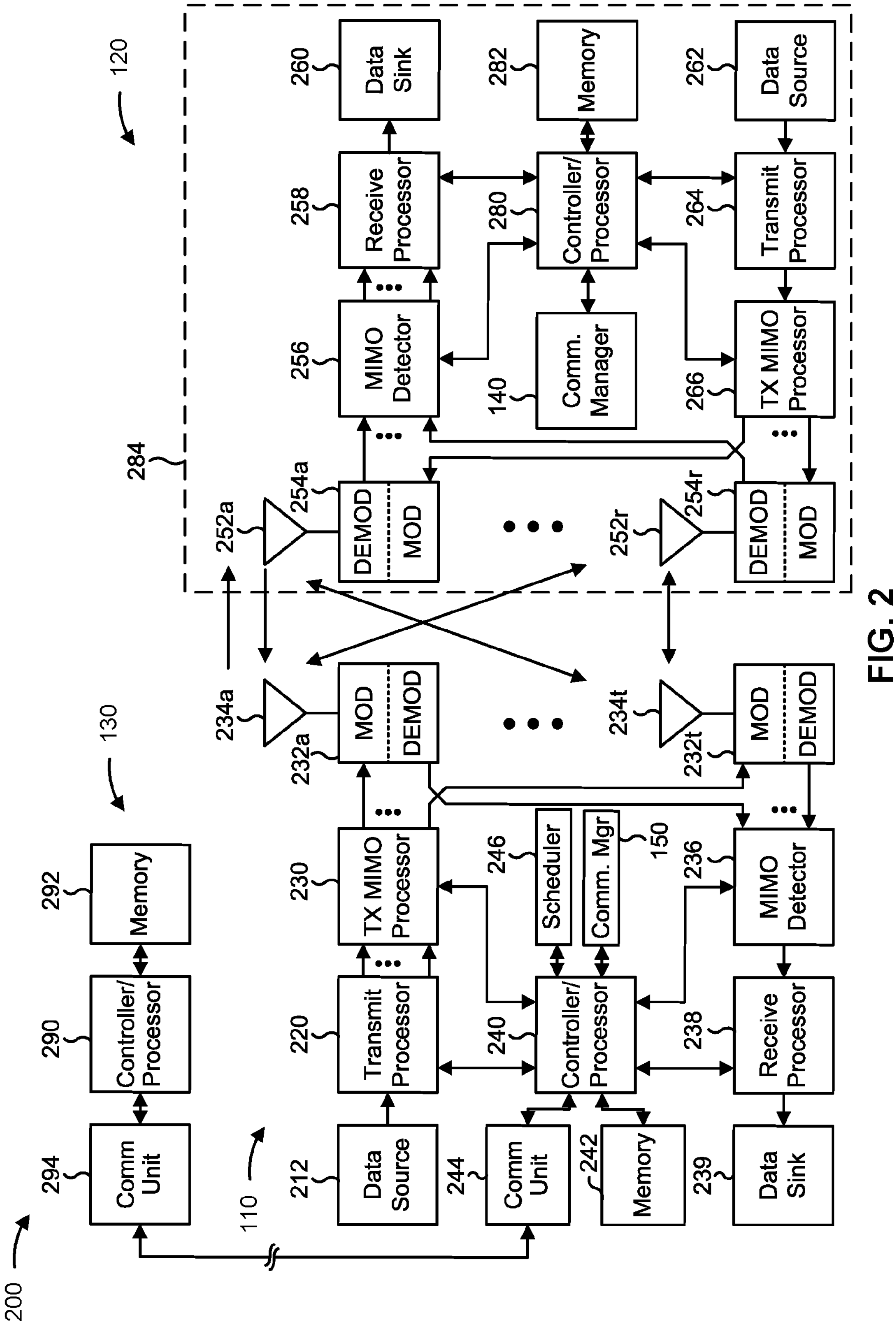
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with hybrid multicast and broadcast, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving a configuration associated with a service, the configuration indicating a first set of one or more parameters for accessing the service in a multicast mode using NAS-based signaling, and a second set of one or more parameters for accessing the service in a broadcast mode within a broadcast service area; means for receiving information associated with the service using one of the multicast mode or the broadcast mode based at least in part on the first set of one or more parameters or the second set of one or more parameters; and/or means for switching to receiving information associated with the service using the other of the multicast mode or the broadcast mode based at least in part on the first set of one or more parameters or the second set of one or more parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a configuration associated with a service, the configuration indicating a first set of one or more parameters for accessing the service in a multicast mode using NAS-based signaling, and a second set of one or more parameters for accessing the service in a broadcast mode within a broadcast service area; means for transmitting information associated with the service using the multicast mode; and/or means for transmitting information associated with the service using the broadcast mode. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
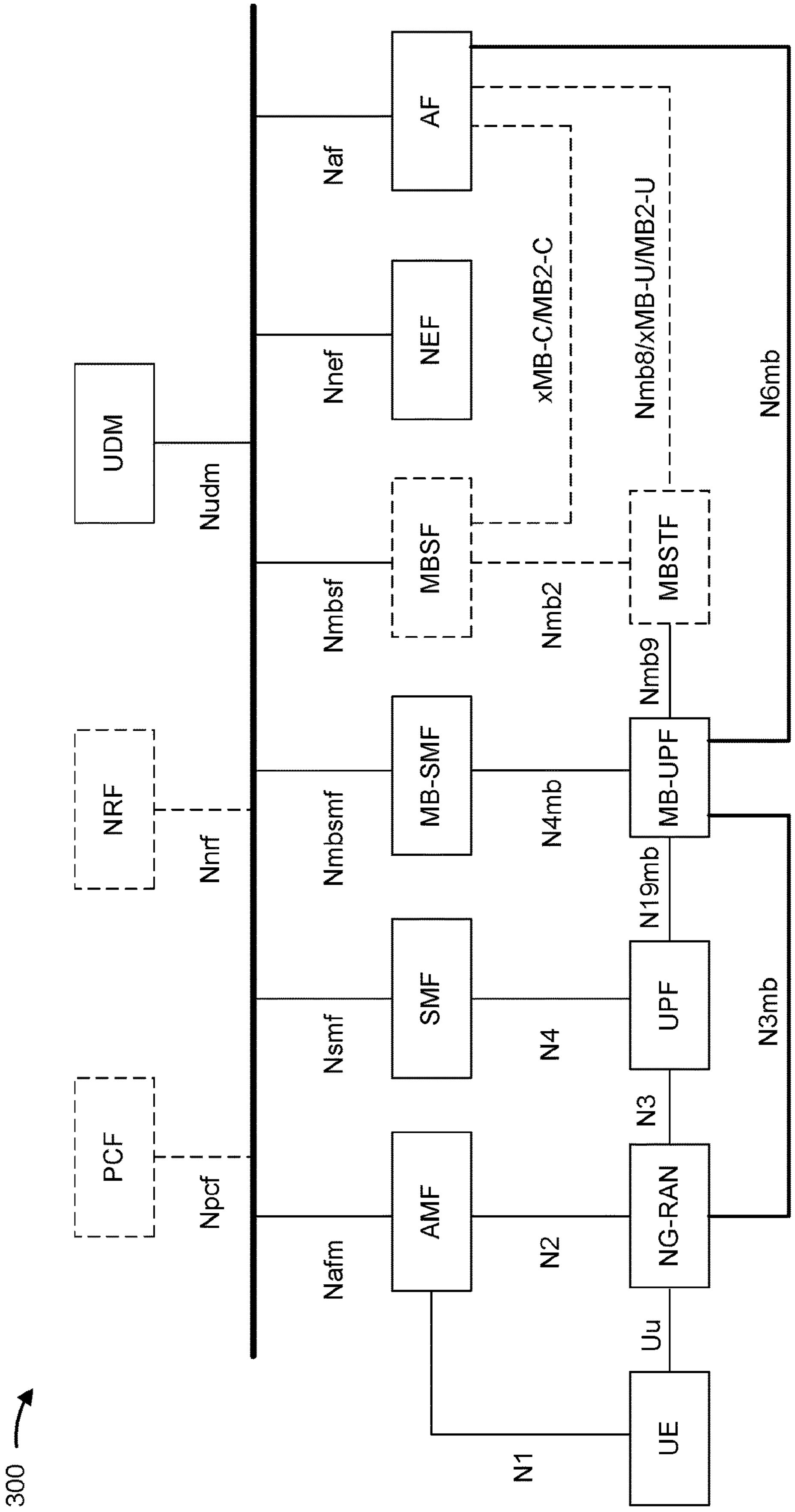
FIG. 3 is a diagram illustrating an example of a core network configuration, in accordance with the present disclosure.

FIG. 3 is a diagram illustrating an example 300 of a core network configuration, in accordance with the present disclosure. The example 300 may include a UE, such as the UE 120, and a next generation (NG) RAN (NG-RAN) node, which may include one or more of the features of the network node 110 described herein.

In some aspects, the core network may include an example functional architecture in which systems and/or methods described herein may be implemented. For example, the core network may include an example architecture of a fifth generation (5G) core network included in a 5G wireless telecommunications system. Although the example architecture of the core network shown in FIG. 3 may be an example of a service-based architecture, in some aspects, the core network may be implemented as a reference-point architecture, or a 4G core network, among other examples.

The core network shown in FIG. 3 may include a number of functional elements. The functional elements may include, for example, a policy control function (PCF), a network function repository function (NRF), a unified data management (UDM) component, an access and mobility management function (AMF), a session management function (SMF), a multicast broadcast session management function (MB-SMF), a multicast broadcast service function (MBSF), a network exposure function (NEF), an application function (AF), a user plane function (UPF), a multicast broadcast user plane function (MB-UPF), and/or a multicast broadcast service transport function (MBSTF), among other examples. These functional elements may be communicatively connected via a message bus. Each of the functional elements shown in FIG. 3 may be implemented on one or more devices associated with a wireless telecommunications system.

In some cases, one or more of the functional elements may be implemented on physical devices, such as an access point, a base station, or a gateway, among other examples. In some cases, one or more of the functional elements may be implemented on a computing device of a cloud computing environment. In some cases, the core network may include only some of the functional elements described herein and/or may include additional functional elements not described herein. Example functions of the functional elements of the core network are described below. However, the described functions are provided as examples only, and the functional elements are not limited to the below descriptions.

The PCF may include one or more devices configured for quality of service (QoS) handling of a multicast broadcast service (MBS) session, providing policy information associated with the MBS session to the MB-SMF (e.g., for authorizing the related QoS profiles), and/or interacting with the user data repository (UDR) for QoS information retrieval.

The NRF may include one or more devices configured for supporting the MB-SMF and MBSF, and their corresponding network function (NF) profiles. For both multicast and broadcast MBS sessions, the NRF may support MB-SMF discovery based at least in part on certain parameters, such as a data network name (DNN), single network slice selection assistance information (S-NSSAI), and the MBS service area. For a multicast MBS session, the NRF may support MB-SMF discovery based at least in part on an MBS session ID.

The UDM may include one or more devices configured for storing user data and profiles in the wireless telecommunications system. In some cases, the UDM may support the managing of subscriptions for authorizing multicast MBS sessions.

The AMF may include one or more devices configured for transferring MBS signaling between the NG-RAN and MB-SMF for MBS session management, selection of NG-RANs for notification of multicast session activation toward UEs in a connection management idle (CM-IDLE) state, and/or selection of NG-RANs for broadcast traffic distribution. In the broadcast mode, the AMF may support NG-RAN selection.

The SMF may include one or more devices configured for discovering an MB-SMF for a multicast session, authorizing multicast session join operations, interacting with the MB-SMF to obtain and manage multicast session context, and/or interacting with the RAN for shared data transmission resource establishment.

The MB-SMF may include one or more devices configured for controlling MBS transport, supporting MBS session management (including QoS control), configuring the MB-UPF for multicast and broadcast flow transport based at least in part on the policy rules for multicast and broadcast services from the PCF (or local policies), and/or allocating and de-allocating temporary mobile group identities (TMGIs).

The MBSF may include one or more devices configured for enabling control plane functionality for configuring MBS sessions, interacting with the AF and MB-SMF for MBS session operations, determining transport parameters, selecting the MB-SMF to serve an MBS session, controlling the MBSTF, and/or determining the sender Internet Protocol (IP) multicast address for the MBS session.

The NEF may include one or more devices configured for providing an interface to the AFs for MBS procedures, providing MBS session and QoS management, interacting with AFs and NFs in the core network, determining transport parameters, and/or selecting an MB-SMF to serve the MBS session.

The AF may include one or more devices configured for requesting a multicast or broadcast service from the core network, such as by providing service information, including QoS requirements, to the core network, instructing the MBS session operation towards the core network, and/or interacting with the NEF for MBS related service exposure.

The UPF may include one or more devices configured for interacting with the SMF for receiving multicast data from the MB-UPF for a core network individual MBS traffic delivery method, and/or delivering multicast data to the UEs via a protocol data unit (PDU) session for core network MBS traffic delivery.

The MB-UPF may include one or more devices configured for packet filtering of incoming downlink packets for multicast and broadcast flows, QoS enforcement and reporting, interacting with the MB-SMF for receiving multicast and broadcast data, and/or delivering multicast and broadcast data to the RAN nodes for core network shared MBS traffic delivery. In some cases, user plane transport functionality may be provided by the MB-UPF via a shared tunnel or unicast delivery (e.g., to non-supporting RAN nodes). In some cases, unicast delivery may be routed over a unicast UPF.

The MBSTF may include one or more devices configured for providing user plane service functionality, providing a media anchor for MBS data traffic, sourcing IP multicast data, and/or providing generic packet transport functionalities.

The message bus may be a logical and/or physical communication structure for communication among the functional elements. Accordingly, the message bus may permit communication between two or more functional elements, whether logically (e.g., using one or more application programming interfaces (APIs)) and/or physically (e.g., using one or more wired and/or wireless connections). Interfaces between different devices may have particular names, as shown on the lines connecting the devices in FIG. 3 (e.g., a Uu interface between the UE and the NG-RAN, an N3 interface between the NG-RAN and the UPF, and so on).

As indicated above, FIG. 3 is provided as an example. Other examples may differ from what is described with regard to FIG. 3.

Figure 4:
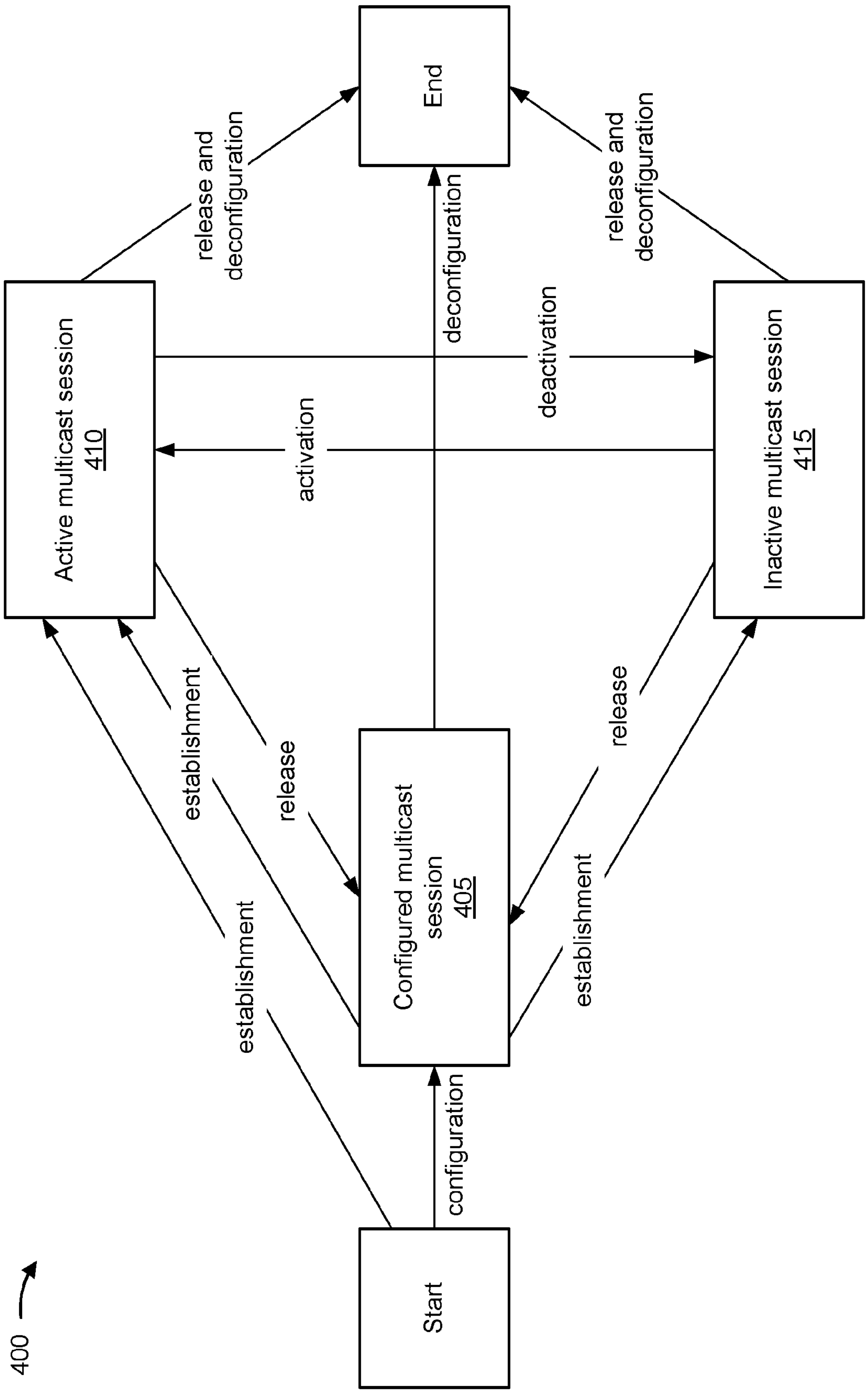
FIG. 4 is a diagram illustrating an example of a multicast session, in accordance with the present disclosure.

FIG. 4 is a diagram illustrating an example 400 of a multicast session, in accordance with the present disclosure.

In some cases, a multicast communication may be a communication of information to a plurality (e.g., a set) of UEs 120. In some cases, each of the UEs 120 may need to join a multicast session prior to receiving information using the multicast communication. For example, the UEs 120 may join the multicast session using NAS based signaling. In some cases, the UEs 120 may need to be authorized, or authenticated, (e.g., by the core network) prior to joining the multicast session. In some cases, not all of the UEs 120 within an area (e.g., a multicast service area) may receive the information via the multicast communication. For example, the network node 110 may transmit the information to a subset of the UEs 120, of the set of UEs 120, within the multicast service area. In some cases, a UE 120 in the multicast service area that has not been authorized or authenticated may not receive the information via the multicast communication. In some cases, the network node 110 is aware of whether or not individual UEs 120, of the set of UEs 120, have received the information using the multicast communication. In some cases, the multicast communication may referred to as a "one-to-many" communication.

In some cases, a broadcast communication may be a communication of information to all UEs 120 within an area (e.g., a broadcast service area). The UEs 120 may not need to join a session prior to receiving the information using the broadcast communication. For example, the UEs 120 do not need to access a session using NAS-based signaling prior to receiving the information using the broadcast communication. In some cases, the UEs 120 may not need to be authorized, or authenticated, prior to receiving information via a broadcast communication. In some cases, the network node 110 may transmit the information to all of the UEs 120 within the broadcast service area. For example, the network node 110 may not be able to broadcast the information to only a subset of the UEs 120. In some cases, the network node 110 may not be aware of whether or not individual UEs 120, of the set of UEs 120, have received the information using the broadcast communication. In some cases, the broadcast communication may referred to as a "one-to-all" communication.

In some cases, the term "service" may refer to any service that is provided by a base station or a network node to a UE, such as a data service, a messaging service, a cellular service, or a web service, among other examples.

As described below, communicating using a multicast mode (e.g., using a multicast session) may involve overhead, such as signaling overhead and bandwidth requirements, that may not be required when using a broadcast mode.

In some cases, the multicast session may include a number of multicast session states, such as a configured multicast session state 405, an active multicast session state 410, and an inactive multicast session state 415.

In some cases, in the configured multicast session state 405, information associated with the multicast session is configured in the NFs serving the multicast session. For example, QoS information associated with the multicast session may be configured in the MB-SMF serving the multicast session. In some cases, an MB-SMF, NEF, and MB-UPF may be reserved for the multicast session. In some cases, a TMGI may be allocated for the multicast session. In some cases, one or more UEs 120 may be able join the multicast session while the multicast session is in the configured state. In some cases, the UEs 120 may be subject to a configuration and authorization check prior to joining the configured multicast session. In some cases, a first accepted UE 120 request to join the multicast session may trigger the multicast session establishment towards the network node 110.

In some cases, in the active multicast session state 410, the multicast session is established and MBS data is transmitted to the UEs 120 that have joined the multicast session. In some cases, radio resources for the multicast session may be configured. To receive multicast MBS session data, UEs 120 that joined the multicast session may need to enter a connected (e.g., CM-CONNECTED) state. Core network and radio resources for the multicast session may be reserved for UEs 120 that joined the multicast session.

In some cases, in the inactive multicast session state 415, the multicast session is established, but no MBS data is being transmitted to the UEs 120 that have joined the multicast session. Radio resources for the multicast session may be released, and the UEs 120 that joined the multicast session may be in a connected state (e.g., CM-CONNECTED) or an idle state (e.g., CM-IDLE). In some cases, UEs 120 may still be allowed to join the multicast session in the inactive multicast session state, subject to the authorization check.

In some cases, one or more of the following procedures may be used to configure, establish, release, activate, deactivate, or deconfigure the configured multicast session state 405, the active multicast session state 410, and the inactive multicast session state 415.

In some cases, using a multicast session configuration procedure, the AF may provide information about the multicast session and may optionally request the allocation of a TMGI. Alternatively, the information about the multicast session may be pre-configured in the network. The configuration may indicate whether the multicast session may be established in an active or inactive state and/or when a multicast session can become active. Once configured, the multicast session state may transition from a null state to a configured state. In some cases, the multicast session may be configured using operations, administration and maintenance (OAM) procedures, or may be established without prior configuration.

In some cases, using a multicast session establishment procedure, the multicast session may be established towards the network node 110 and the UE 120. For example, the multicast session may be established when the join request of the first UE 120 for the multicast session is accepted. Once established, the multicast session state may transition from the null state or the configured state to one of the inactive state or the active state.

In some cases, using a multicast session activation procedure, the radio resources for the multicast session may be established, and multicast session data may start to be transmitted to the UE 120. In some cases, the multicast session activation may be triggered by the core network. UEs 120 in an idle state, such as a CM-IDLE state and a radio resource control (RRC) idle state (RRC-IDLE), or in a (CM-CONNECTED) state with RRC inactive state, that joined the multicast session may be notified. In some cases, the activation may be triggered by an AF request or a data notification from the MB-UPF. Once activated, the multicast session state may transition from the inactive state to the active state.

In some cases, using a multicast session deactivation procedure, the radio resources for the multicast session may be released and the multicast session data may stop being transmitted to the UEs 120. In some cases, the multicast session activation may be triggered by the core network. In some cases, deactivation may be triggered by an AF request. Once deactivated, the multicast session state may transition from the active state to the inactive state.

In some cases, using a multicast session release procedure, the resources for the multicast session may be released in both the core network nodes and the radio access network nodes. The multicast session release may be triggered by the last UE 120 leaving the multicast session, or by a multicast session de-configuration procedure. Once released, the multicast session state may transition from the active or the inactive state to the configured state.

In some cases, using a multicast session deconfiguration procedure, all information about the multicast session may be removed from the core network, and the TMGI for the multicast session may be deallocated. In some cases, the deconfiguration may be triggered by an AF request. Once deconfigured, the multicast session state may transition from the configured state, active state, or inactive state, to the null state.

As described above, communicating information in a multicast mode involves signaling overhead that may require certain bandwidth conditions. For example, use of the multicast mode may require initiating an NAS session management join procedure, establishing a PDU session, and/or dedicating RRC signals to configure a multicast radio bearer (MRB). However, multicast communications may allow a base station or network node to communicate information to a selected (e.g., dedicated) number of UEs within a multicast service area. For example, using a multicast communication, the network node may be able to transmit information to a subset of UEs, of a set of UEs, within the multicast service area. In contrast, broadcast communications may not enable the network node to selectively transmit information. For example, using a broadcast mode, the network node may only be able to transmit information to all of the UEs, or none of the UEs, within the broadcast service area. However, broadcast communications have lower signaling and bandwidth requirements than multicast communications.

Techniques and apparatuses are described herein to enable switching between a multicast communication of a service and a broadcast communication of the service. For example, a UE may receive a configuration associated with the service. The configuration may indicate a first set of one or more parameters for accessing the service in a multicast mode (e.g., using NAS-based signaling), and a second set of one or more parameters for accessing the service in a broadcast mode (e.g., within a broadcast service area). The UE may (e.g., initially) receive information associated with the service using one of the multicast mode or the broadcast mode. However, based at least in part on the first set of parameters or the second set of parameters, the UE may switch to the other of the multicast mode or the broadcast mode for receiving the information. In some aspects, the first set of parameters may include an identifier associated with the multicast mode and an indication of an area associated with the multicast mode, and the second set of parameters may include an identifier associated with the broadcast mode and an indication of the broadcast service area.

In some aspects, the UE may switch between the multicast mode and the broadcast mode based at least in part on whether or not the UE is within the broadcast service area, or based at least in part on a quality of communications associated with the multicast mode or the broadcast mode. For example, at a first time, the UE may receive information using the broadcast mode. At a second time, the UE may determine that the UE has moved outside of the broadcast service area. Additionally, or alternatively, the UE may determine that a quality of communications between the UE and the network node using the broadcast mode is poor (e.g., below a threshold). Thus, the UE may switch to the multicast mode for receiving information associated with the service.

The techniques and apparatuses described herein may enable the UE to switch between receiving information using the multicast mode or the broadcast mode based at least in part on location information or channel quality information. Thus, the UE may selectively reduce signaling overhead and bandwidth requirements, while lowering a likelihood that the UE will not receive information due to location changes or poor channel conditions.

As indicated above, FIG. 4 is provided as an example. Other examples may differ from what is described with regard to FIG. 4.

Figure 5:
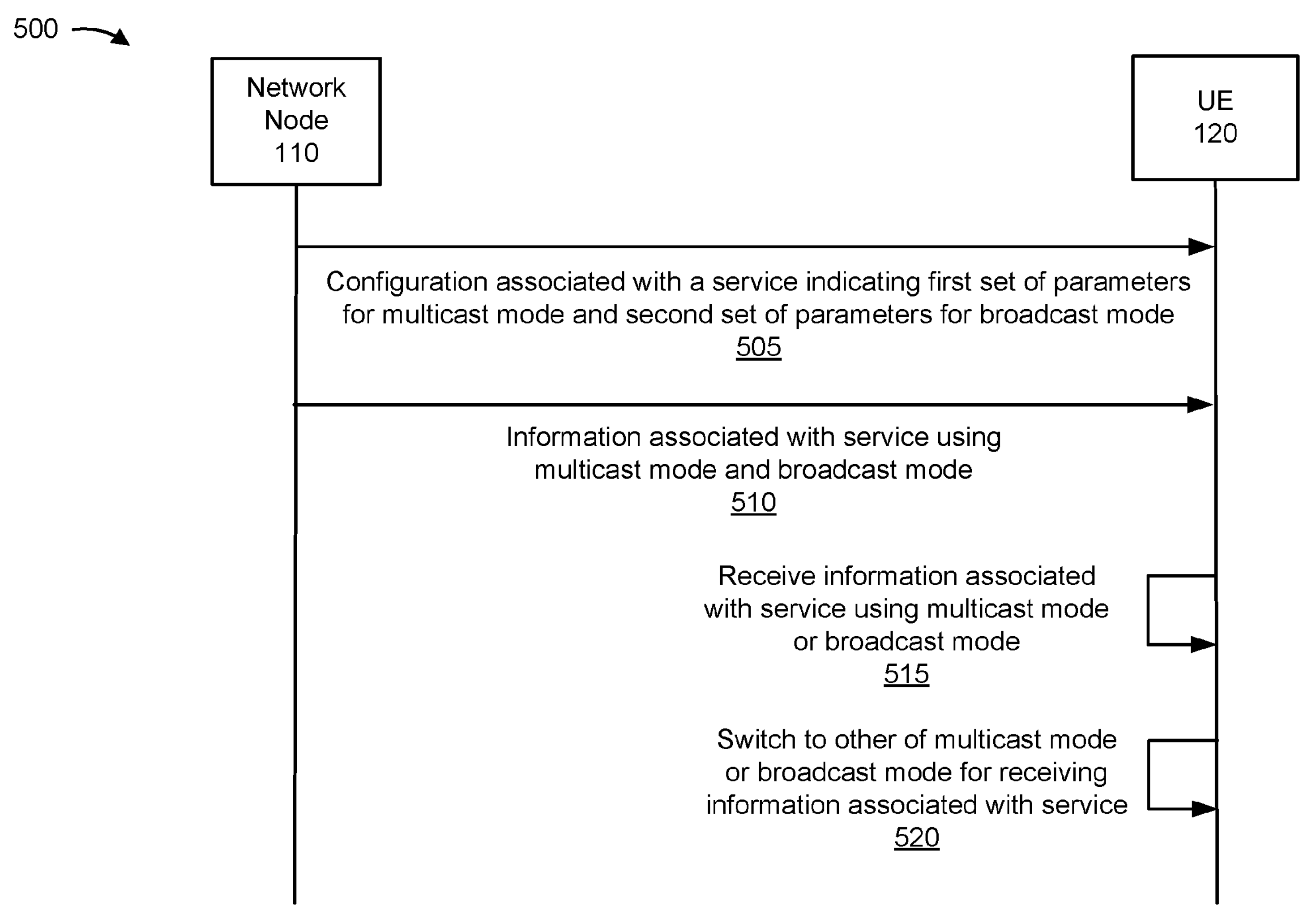
FIG. 5 is a diagram illustrating an example associated with hybrid multicast and broadcast, in accordance with the present disclosure.

FIG. 5 is a diagram illustrating an example 500 of hybrid multicast and broadcast communications, in accordance with the present disclosure. A UE, such as the UE 120, may communicate with a network node, such as the network node 110, for receiving information associated with a service.

As shown in connection with reference number 505, the network node 110 may transmit, and the UE 120 may receive, a configuration associated with the service. The configuration may indicate a first set of one or more parameters for accessing the service in a multicast mode (e.g., using NAS-based signaling) within multicast service area, and a second set of one or more parameters for accessing the service in a broadcast mode (e.g., within a broadcast service area).

In some aspects, the first set of parameters may include an identifier associated with the multicast mode and an indication of an area associated with the multicast mode. In some aspects, the second set of parameters may include an identifier associated with the broadcast mode and an indication of the broadcast service area. As described below, the UE 120 may determine whether to receive information associated with the service using the multicast mode or the broadcast mode based at least in part on the first set of parameters and the second set of parameters.

In some aspects, the configuration may include a session type indicator that indicates that the service is available via both the multicast mode and the broadcast mode. For example, the session indicator may indicate that both a first session type associated with a multicast mode, and a second session type associated with the broadcast mode, are available for a given service. In some aspects, the configuration may indicate a single multicast radio bearer for the multicast mode and the broadcast mode. The session type indicator may enable the UE 120 to receive information associated with the service, via the multicast mode or the broadcast mode, using the multicast radio bearer. In some aspects, the first set of parameters, the second set of parameters, the session type indicator, or the multicast radio bearer may be indicated as part of a service announcement transmitted by the network node 110 to the UE 120.

In some aspects, the service announcement may be used to announce an availability of the MBS service. The service announcement may provide the UE 120 with an indication of the multicast and broadcast services to be delivered as part of the MBS session. For example, the service announcement may include an MBS session ID (e.g., TMGI or source specific IP Multicast address) for the service. If the MBS session is using the multicast mode, the service announcement may include the DNN and S-NSSAI of the PDU session to indicate which PDU session is associated with the MBS session. In some cases, dedicated RRC signaling may be used to configure the MRB to the UEs.

In some aspects, an MBS session may be established for both the multicast and broadcast communications. For example, a common N3 general packet radio service (GPRS) tunnelling protocol (GTP-U) tunnel may be configured for both the multicast communication and the broadcast communication. In some aspects, the multicast communication may be separate from the broadcast communication. For example, independent N3/GTP-U tunnels may be configured for multicast and broadcast communications (e.g., a first tunnel for multicast and a second tunnel for broadcast). In some aspects, a common MRB may be used for the multicast and broadcast communications. For example, the network node 110 may configure the same MRB for the multicast and broadcast communications of the same service.

As shown in connection with reference number 510, the network node 110 may transmit, and the UE 120 may receive, information associated with the service using the multicast mode and the broadcast mode. For example, the network node 110 may transmit a communication using the multicast mode and a communication using the broadcast mode. The communication using the multicast mode and the communication using the broadcast mode may include the same information (e.g., information associated with the service).

In some aspects, the network node 110 may transmit the information associated with the service, in the multicast mode, using a point-to-point (PTP) transmission mode or a point-to-multipoint (PTM) transmission mode of the multicast radio bearer. The point-to-point transmission mode of the multicast radio bearer may include a communication from the network node 110 to a single UE 120 (e.g., a unicast transmission). In contrast, the point-to-multipoint transmission mode of the multicast radio bearer may include a communication from the network node 110 to multiple UEs 120 (e.g., a multicast transmission). In some aspects, the network node 110 may transmit information (e.g., control information) associated with the multicast transmission using a multimedia broadcast multicast service control channel (MCCH).

As described above, transmissions using the multicast mode may involve more overhead than transmissions using the broadcast mode. In some aspects, the network node 110 may transmit information to a plurality of UEs 120 in the multicast mode using a dedicated RRC message. In some aspects, only UEs 120 in an RRC connected state may receive the multicast communications, whereas UEs 120 in an RRC inactive state may not receive the multicast communications. In contrast, a UE 120 having any RRC state may receive broadcast communications. In some aspects, the multicast mode may support Layer 2 retransmission of communications via PTP transmissions and handover. In contrast, the broadcast mode may not support Layer 2 retransmission of communications via PTP transmissions and handover.

As shown in connection with reference number 515, the UE 120 may receive information associated with the service using the multicast mode or the broadcast mode. In some aspects, the UE 120 may receive the information associated with the service using the multicast mode or the broadcast mode based at least in part on the first set of parameters or the second set of parameters, as described in the examples below.

In some aspects, the UE 120 may determine to receive the information associated with the service using the multicast mode. The UE 120 may determine to receive the information using the multicast mode based at least in part on a parameter of the first set of parameters or a parameter of the second set of parameters. For example, the UE 120 may determine to receive information using the multicast mode based at least in part on determining that the UE 120 is not within the broadcast service area, and/or based at least in part on determining that the UE 120 is configured (e.g., with the dedicated RRC signaling) to receive the information using the multicast mode. In this example, the UE 120 may receive the information associated with the service using an identifier associated with the multicast mode of the service, and may disable the receiving of information having an identifier associated with the broadcast mode of the service. For example, the UE 120 may detect first information having an identifier associated with the multicast mode of the service and second information having an identifier associated with the broadcast mode of the service, and may determine only to receive (e.g., accept or decode) the first information (e.g., the second information may be dropped or ignored). As described above, receiving the information using the multicast mode may include joining a multicast session (e.g., using the NAS-based signaling). In some cases, the UE 120 may initiate the joining of the multicast session. Additionally, or alternatively, the UE 120 may need to be authenticated and/or authorized by the core network during multicast NAS signaling based session joining procedure prior to receiving the information using the multicast mode.

In some aspects, the UE 120 may determine to receive the information associated with the service using the broadcast mode. The UE 120 may determine to receive the information associated with the service using the broadcast mode based at least in part on a parameter of the first set of parameters or a parameter of the second set of parameters. For example, the UE 120 may determine that the UE 120 is within an area covered by the broadcast service area. In this example, the UE 120 may receive information associated with the service using the identifier associated with the broadcast mode of the service, and may disable the receiving of information having the identifier associated with the multicast mode of the service. For example, the UE 120 may detect first information having an identifier associated with the multicast mode and second information having an identifier associated with the broadcast mode, and may determine only to receive (e.g., accept or decode) the second information (e.g., the first information may be dropped or ignored).

In some aspects, the UE 120 may determine a quality of a communication using the multicast mode and/or a quality of a communication using the broadcast mode. In this example, the UE 120 may be able to receive the information using both the multicast mode and the broadcast mode. For example, the UE 120 may be in the broadcast service area, and may be configured (e.g., with dedicated RRC signaling) for receiving information using the multicast mode. The UE 120 may receive a communication using the multicast mode, and may receive a communication using the broadcast mode. The UE 120 may determine whether to receive the information using the multicast mode or the broadcast mode based at least in part determining a quality of the received communications. For example, the UE 120 may determine that the communication using the multicast mode has a higher quality than the communication using the broadcast mode, and may therefore determine to receive information associated with the service using the multicast mode. Alternatively, the UE 120 may determine that the communication using the broadcast mode has a higher quality than the communication using the multicast mode, and may therefore determine to receive information associated with the service using the broadcast mode. In some aspects, the quality of the communications may be compared to one or more thresholds, and the UE 120 may select either the multicast mode or the broadcast mode based at least in part on comparing a quality of the received communications to the one or more thresholds. In some aspects, the UE 120 may determine the quality of the communications using the multicast mode or the broadcast mode based at least in part on a packet error rate, block error rate, reference signal received power, or reference signal received quality of the communications.

In some aspects, the UE 120 may transmit an indication, to the network node 110, indicating whether the UE 120 is receiving the information associated with the service using the multicast mode or the broadcast mode. For example, the UE 120 may transmit the indication in an RRC multicast broadcast interest indication. The network node 110 may use the indication in determining whether to continue communicating the information associated with the service using the multicast mode or the broadcast mode. In some aspects, the UE 120 may receive, from the network node 110, an indication of whether the UE should receive the information associated with the service using the multicast mode or the broadcast mode. For example, the network node 110 may transmit an indication to the UE 120 to receive the information using the broadcast mode based at least in part on determining that the network is experiencing high levels of data traffic. Alternatively, the network node 110 may transmit an indication to the UE 120 to receive the information using the multicast mode based at least in part on identifying that the UE 120 is outside, or near the outside, of the broadcast service area.

As shown in connection with reference number 520, the UE 120 may switch to the multicast mode or the broadcast mode for receiving information associated with the service. In some aspects, the UE 120 may switch to the other of the multicast mode or the broadcast mode based at least in part on the first set of parameters or the second set of parameters.

In some aspects, as described above, the UE 120 may be receiving the information associated with the service using the multicast mode, and may switch to the broadcast mode for receiving the information associated with the service. The UE 120 may switch to the broadcast mode based at least in part on a parameter of the first set of parameters or a parameter of the second set of parameters. For example, the UE 120 may determine to switch to the broadcast mode based at least in part on determining that the UE 120 has moved into the broadcast service area. Additionally, or alternatively, the UE 120 may determine to switch to the broadcast mode based at least in part on an indication that the network is experiencing poor signal quality.

In some aspects, as described above, the UE 120 may be receiving the information associated with the service using the broadcast mode. and may switch to the multicast mode for receiving the information associated with the service. The UE 120 may switch to the multicast mode based at least in part on a parameter of the first set of parameters or a parameter of the second set of parameters. For example, the UE 120 may determine to switch to the multicast mode based at least in part on determining that the UE 120 is no longer in the broadcast service area. Additionally, or alternatively, the UE 120 may determine to switch to the multicast mode based at least in part on being configured with multicast signaling information (e.g., dedicated RRC signaling associated with the multicast mode).

In some aspects, as described above, the UE 120 may be receiving the information associated with the service using the multicast mode or the broadcast mode, and may switch to receiving the information using the other of the multicast mode or the broadcast mode. For example, the UE 120 may be receiving the information using the multicast mode, and may switch to receiving the information using the broadcast mode. Alternatively, the UE 120 may be receiving the information using the broadcast mode, and may switch to receiving the information using the multicast mode. The UE 120 may switch to the other of the multicast mode or the broadcast mode based at least in part on determining that a quality of the multicast mode or the broadcast mode is better than the quality of the other of the multicast mode or the broadcast mode. For example, while receiving in the broadcast mode, the UE 120 may determine that an RSRP associated with the multicast mode is better than an RSRP associated with the broadcast mode. Thus, the UE 120 may switch to the multicast mode for receiving the information.

Alternatively, while receiving in the multicast mode, the UE 120 may determine that an RSRP associated with the broadcast mode is better than an RSRP associated with the multicast mode. Thus, the UE 120 may switch to the broadcast mode for receiving the information.

In some aspects, the network node 110 or the UE 120 may maintain (e.g., store) a context associated with the multicast mode. For example, the network node 110 or the UE 120 may maintain the context (e.g., in a deactivated state) after switching to the broadcast mode, for a duration, such as until an expiration of a timer. Additionally, or alternatively, the network node 110 or the UE 120 may maintain the context until the network node 110 or the UE 120 determines that there are no UEs receiving the multicast communications. In some aspects, the context may indicate one or more multicast sessions that the UE 120 has previously joined. In some aspects, the network node 110 may determine that no UEs are receiving the multicast communication of the service based at least in part on handover signaling, a radio resource control redirection, hybrid automatic repeat request feedback associated with a multipoint radio bearer, a non-access stratum tracking area update procedure, a UE resuming a suspended connection outside of a multicast service area, a UE assisted radio resource control or non-access stratum signal indicating that the UE is leaving the multicast service area, or a radio access network indication associated with the UE leaving the multicast service area. Maintaining the context may enable the UE 120 to switch back to the multicast mode without needing to be reconfigured with the dedicated multicast signaling. In contrast to the multicast mode, the network node 110 and the UE 120 may not maintain a context associated with the broadcast mode.

In some aspects, the UE 120 may receive a group paging message associated with the multicast mode when the UE 120 is operating using the broadcast mode. Based at least in part on receiving the group paging message while the UE 120 is operating using the broadcast mode, the UE 120 may transmit an indication (e.g., a group paging response) to the network node 110 that the UE 120 is receiving the information associated with the service using the broadcast mode. Alternatively, the UE 120 may determine not to respond to the group paging message. The network node 110 may determine whether to stop transmitting information associated with the service using the multicast mode based at least in part on receiving a group paging response from a plurality of the UEs (e.g., when there are no UEs or less than a threshold number of UEs receiving the service via the multicast mode).

As described herein, the UE 120 may switch between receiving information using the multicast mode or the broadcast mode based at least in part on location information or channel quality information. Thus, the UE 120 may selectively reduce signaling overhead and bandwidth requirements, while lowering a likelihood that the UE 120 will not receive information due to location changes or poor channel conditions.

As indicated above, FIG. 5 is provided as an example. Other examples may differ from what is described with regard to FIG. 5.

Figure 6:
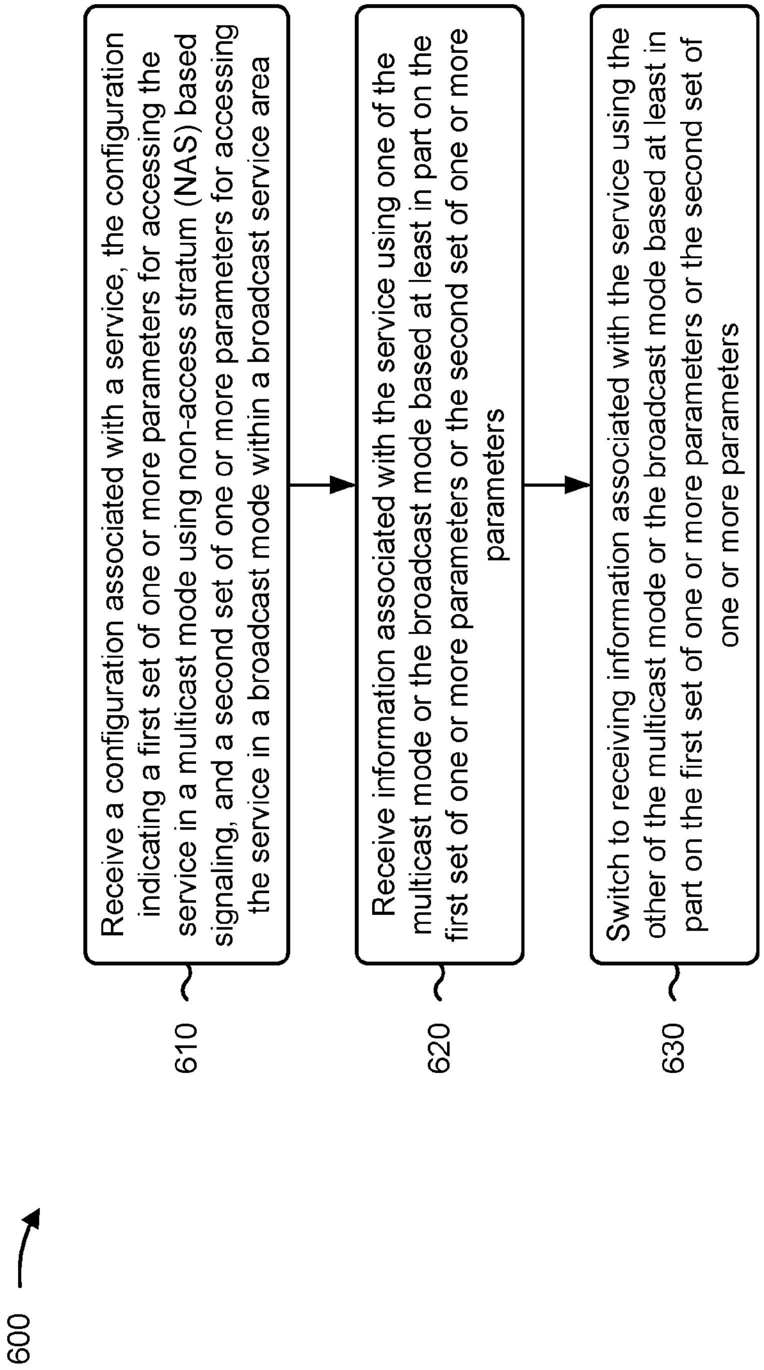
FIG. 6 is a diagram illustrating an example process associated with hybrid multicast and broadcast, in accordance with the present disclosure.

FIG. 6 is a diagram illustrating an example process 600 performed, for example, by a UE, in accordance with the present disclosure. Example process 600 is an example where the UE (e.g., UE 120) performs operations associated with hybrid multicast and broadcast.

As shown in FIG. 6, in some aspects, process 600 may include receiving a configuration associated with a service, the configuration indicating a first set of one or more parameters for accessing the service in a multicast mode using NAS based signaling, and a second set of one or more parameters for accessing the service in a broadcast mode within a broadcast service area (block 610). For example, the UE (e.g., using communication manager 140 and/or reception component 802, depicted in FIG. 8) may receive a configuration associated with a service, the configuration indicating a first set of one or more parameters for accessing the service in a multicast mode using NAS-based signaling, and a second set of one or more parameters for accessing the service in a broadcast mode within a broadcast service area, as described above.

As further shown in FIG. 6, in some aspects, process 600 may include receiving information associated with the service using one of the multicast mode or the broadcast mode based at least in part on the first set of one or more parameters or the second set of one or more parameters (block 620). For example, the UE (e.g., using communication manager 140 and/or reception component 802, depicted in FIG. 8) may receive information associated with the service using one of the multicast mode or the broadcast mode based at least in part on the first set of one or more parameters or the second set of one or more parameters, as described above.

As further shown in FIG. 6, in some aspects, process 600 may include switching to receiving information associated with the service using the other of the multicast mode or the broadcast mode based at least in part on the first set of one or more parameters or the second set of one or more parameters (block 630). For example, the UE (e.g., using communication manager 140 and/or switching component 808, depicted in FIG. 8) may switch to receiving information associated with the service using the other of the multicast mode or the broadcast mode based at least in part on the first set of one or more parameters or the second set of one or more parameters, as described above.

Process 600 may include additional aspects, such as any single aspect or any combination of aspects described below and/or in connection with one or more other processes described elsewhere herein.

With respect to process 600, in a first aspect, process 600 includes joining a multicast session associated with the multicast mode using the NAS-based signaling.

With respect to process 600, in a second aspect, alone or in combination with the first aspect, the UE may be authorized or authenticated prior to receiving the information associated with the service using the multicast mode.

With respect to process 600, in a third aspect, alone or in combination with one or more of the first and second aspects, the first set of one or more parameters comprises an identifier associated with the multicast mode and an indication of an area associated with the multicast mode, and the second set of one or more parameters comprises an identifier associated with the broadcast mode and an indication of the broadcast service area.

With respect to process 600, in a fourth aspect, alone or in combination with one or more of the first through third aspects, the configuration includes a session type indicator that indicates that the service is available via both the multicast mode and the broadcast mode.

With respect to process 600, in a fifth aspect, alone or in combination with one or more of the first through fourth aspects, the configuration includes a first session type indicator associated with the multicast mode and a second session type indicator associated with the broadcast mode.

With respect to process 600, in a sixth aspect, alone or in combination with one or more of the first through fifth aspects, process 600 includes determining, based at least in part on the UE being in the broadcast service area, to receive the information associated with the service using the broadcast mode.

With respect to process 600, in a seventh aspect, alone or in combination with one or more of the first through sixth aspects, process 600 includes receiving the information associated with the service using an identifier associated with the broadcast mode, and disabling the receiving of information having an identifier associated with the multicast mode.

With respect to process 600, in an eighth aspect, alone or in combination with one or more of the first through seventh aspects, process 600 includes determining that the UE is no longer in the broadcast service area, wherein switching to the other of the multicast mode or the broadcast mode comprises switching to the multicast mode based at least in part on determining that the UE is no longer in the broadcast service area.

With respect to process 600, in a ninth aspect, alone or in combination with one or more of the first through eighth aspects, process 600 includes determining a quality of a communication using the multicast mode or the broadcast mode, wherein switching to the other of the multicast mode or the broadcast mode is based at least in part on the quality of the communication using the multicast mode or the broadcast mode.

With respect to process 600, in a tenth aspect, alone or in combination with one or more of the first through ninth aspects, the quality of the communication using the multicast mode or the broadcast mode is determined based at least in part on a packet error rate, a block error rate, a reference signal received power, or a reference signal received quality of the communication.

With respect to process 600, in an eleventh aspect, alone or in combination with one or more of the first through sixth aspects, process 600 includes determining, based at least in part on one or more of the first set of one or more parameters, to receive the information associated with the service using the multicast mode.

With respect to process 600, in a twelfth aspect, alone or in combination with one or more of the first through eleventh aspects, process 600 includes receiving the information associated with the service using an identifier associated with the multicast mode, and disabling the receiving of information having an identifier associated with the broadcast mode.

With respect to process 600, in a thirteenth aspect, alone or in combination with one or more of the first through twelfth aspects, process 600 includes determining that the UE has moved into the broadcast service area, wherein switching to the other of the multicast mode or the broadcast mode comprises switching to the broadcast mode based at least in part on determining that the UE has moved into the broadcast service area.

With respect to process 600, in a fourteenth aspect, alone or in combination with one or more of the first through thirteenth aspects, process 600 includes maintaining a context associated with the multicast mode, until an expiration of a timer, after switching to the broadcast mode.

With respect to process 600, in a fifteenth aspect, alone or in combination with one or more of the first through fourteenth aspects, process 600 includes receiving a group paging message associated with the multicast mode, and transmitting an indication that the UE is receiving the information associated with the service using the broadcast mode.

With respect to process 600, in a sixteenth aspect, alone or in combination with one or more of the first through fifteenth aspects, the configuration indicates a single multicast radio bearer for the multicast mode and the broadcast mode.

With respect to process 600, in a seventeenth aspect, alone or in combination with one or more of the first through sixteenth aspects, process 600 includes transmitting an indication of whether the UE is receiving information associated with the service using the multicast mode or the broadcast mode.

With respect to process 600, in an eighteenth aspect, alone or in combination with one or more of the first through seventeenth aspects, process 600 includes receiving an indication of whether the UE should receive the information associated with the service using the multicast mode or the broadcast mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
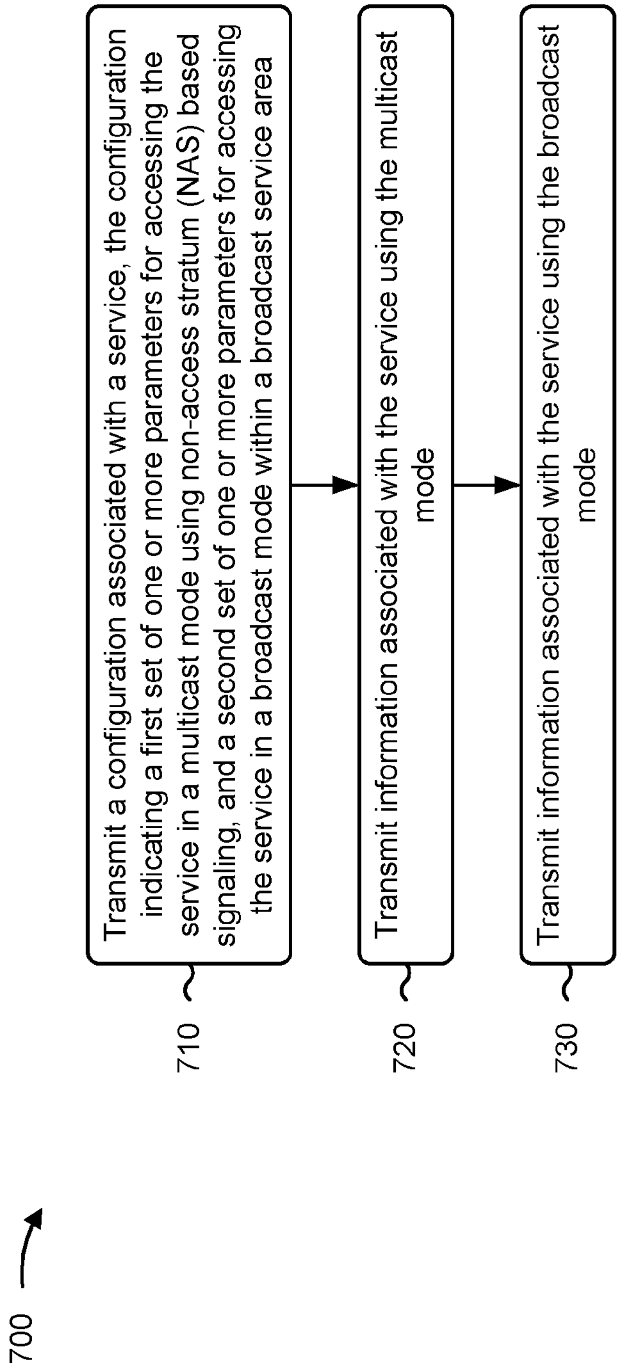
FIG. 7 is a diagram illustrating an example process associated with hybrid multicast and broadcast, in accordance with the present disclosure.

FIG. 7 is a diagram illustrating an example process 700 performed, for example, by a network node, in accordance with the present disclosure. Example process 700 is an example where the network node (e.g., network node 110) performs operations associated with hybrid multicast and broadcast.

As shown in FIG. 7, in some aspects, process 700 may include transmitting a configuration associated with a service, the configuration indicating a first set of one or more parameters for accessing the service in a multicast mode using NAS based signaling, and a second set of one or more parameters for accessing the service in a broadcast mode within a broadcast service area (block 710). For example, the network node (e.g., using communication manager 150 and/or transmission component 904, depicted in FIG. 9) may transmit a configuration associated with a service, the configuration indicating a first set of one or more parameters for accessing the service in a multicast mode using NAS based signaling, and a second set of one or more parameters for accessing the service in a broadcast mode within a broadcast service area, as described above.

As further shown in FIG. 7, in some aspects, process 700 may include transmitting information associated with the service using the multicast mode (block 720). For example, the network node (e.g., using communication manager 150 and/or transmission component 904, depicted in FIG. 9) may transmit information associated with the service using the multicast mode, as described above.

As further shown in FIG. 7, in some aspects, process 700 may include transmitting information associated with the service using the broadcast mode (block 730). For example, the network node (e.g., using communication manager 150 and/or transmission component 904, depicted in FIG. 9) may transmit information associated with the service using the broadcast mode, as described above.

Process 700 may include additional aspects, such as any single aspect or any combination of aspects described below and/or in connection with one or more other processes described elsewhere herein.

With respect to process 700, in a first aspect, transmitting the information associated with the service using the multicast mode includes transmitting the information using a point-to-point transmission mode or a point-to-multipoint transmission mode of a multicast radio bearer.

With respect to process 700, in a second aspect, alone or in combination with the first aspect, transmitting the information associated with the service using the broadcast mode includes transmitting the information using a multicast radio bearer or a multimedia broadcast multicast service control channel.

With respect to process 700, in a third aspect, alone or in combination with one or more of the first and second aspects, transmitting the information associated with the service using the multicast mode includes transmitting the information using a dedicated radio resource control message or a multicast radio bearer associated with a point-to-point transmission or a point-to-multipoint transmission.

With respect to process 700, in a fourth aspect, alone or in combination with one or more of the first through third aspects, process 700 includes configuring a single multicast radio bearer for the multicast mode and the broadcast mode.

With respect to process 700, in a fifth aspect, alone or in combination with one or more of the first through fourth aspects, the multicast mode supports at least one of a handover or a Layer 2 retransmission of the service using a point-to-point transmission.

With respect to process 700, in a sixth aspect, alone or in combination with one or more of the first through fifth aspects, process 700 includes receiving, from a UE, an indication of whether the UE is using the multicast mode or the broadcast mode.

With respect to process 700, in a seventh aspect, alone or in combination with one or more of the first through sixth aspects, process 700 includes transmitting, to a UE, an indication of whether the UE should use the multicast mode or the broadcast mode.

With respect to process 700, in an eighth aspect, alone or in combination with one or more of the first through seventh aspects, process 700 includes storing a context associated with the multicast mode, in a deactivated state, until no UEs are receiving the information associated with the service using the multicast mode, and a timer has expired.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
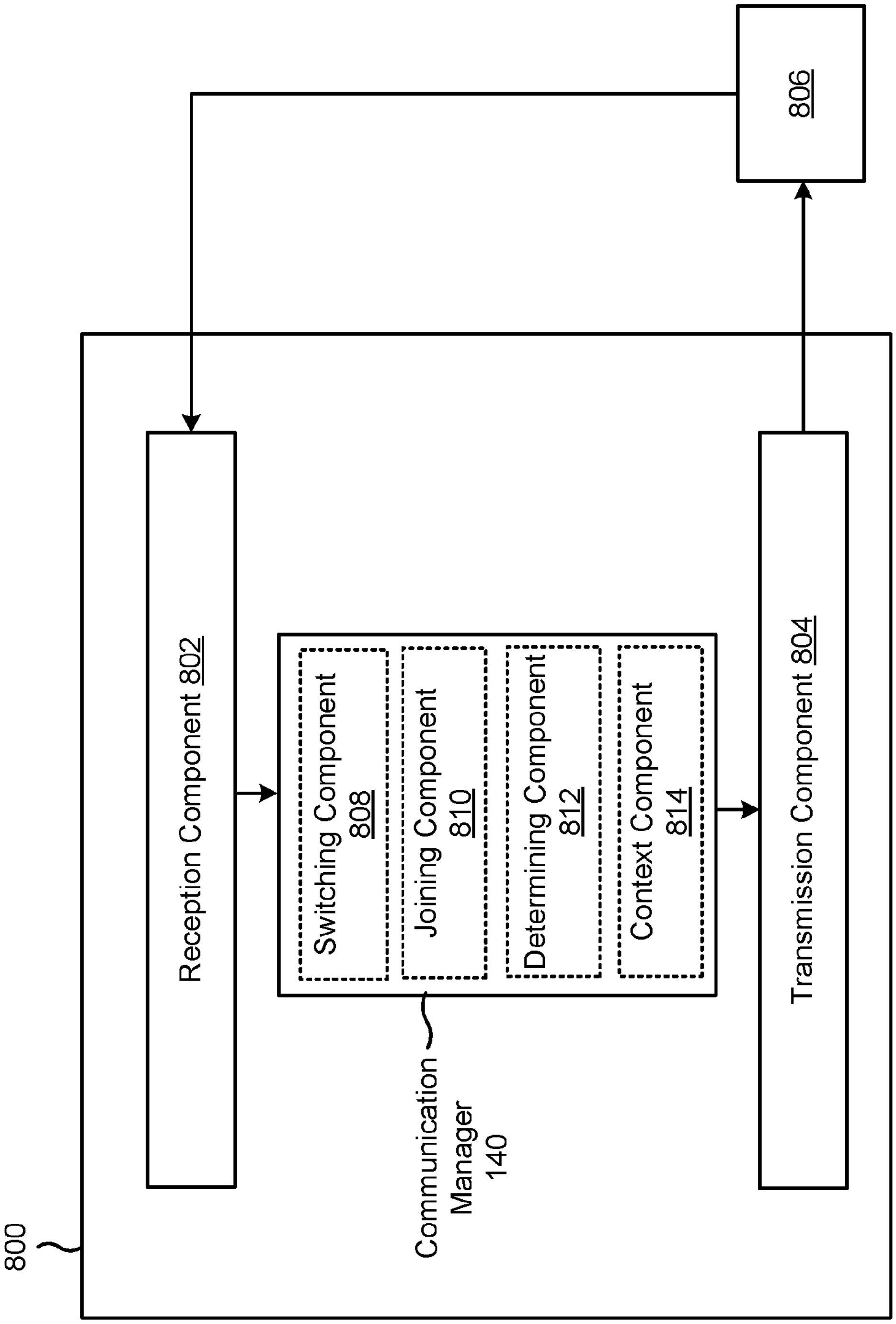
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 140. The communication manager 140 may include one or more of a switching component 808, a joining component 810, a determining component 812, or a context component 814, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration associated with a service, the configuration indicating a first set of one or more parameters for accessing the service in a multicast mode using NAS based signaling, and a second set of one or more parameters for accessing the service in a broadcast mode within a broadcast service area. The reception component 802 may receive information associated with the service using one of the multicast mode or the broadcast mode based at least in part on the first set of one or more parameters or the second set of one or more parameters. The switching component 808 may switch to receiving information associated with the service using the other of the multicast mode or the broadcast mode based at least in part on the first set of one or more parameters or the second set of one or more parameters.

The joining component 810 may join a multicast session associated with the multicast mode using the NAS-based signaling.

The determining component 812 may determine, based at least in part on the UE being in the broadcast service area, to receive the information associated with the service using the broadcast mode.

The reception component 802 may receive the information associated with the service using an identifier associated with the broadcast mode, and disabling the receiving of information having an identifier associated with the multicast mode.

The determining component 812 may determine that the UE is no longer in the broadcast service area, wherein switching to the other of the multicast mode or the broadcast mode comprises switching to the multicast mode based at least in part on determining that the UE is no longer in the broadcast service area.

The determining component 812 may determine a quality of a communication using the multicast mode or the broadcast mode, wherein switching to the other of the multicast mode or the broadcast mode is based at least in part on the quality of the communication using the multicast mode or the broadcast mode.

The determining component 812 may determine, based at least in part on one or more of the first set of one or more parameters, to receive the information associated with the service using the multicast mode.

The reception component 802 may receive the information associated with the service using an identifier associated with the multicast mode, and disabling the receiving of information having an identifier associated with the broadcast mode.

The determining component 812 may determine that the UE has moved into the broadcast service area, wherein switching to the other of the multicast mode or the broadcast mode comprises switching to the broadcast mode based at least in part on determining that the UE has moved into the broadcast service area.

The context component 814 may maintain a context associated with the multicast mode, until an expiration of a timer, after switching to the broadcast mode.

The reception component 802 may receive a group paging message associated with the multicast mode.

The transmission component 804 may transmit an indication that the UE is receiving the information associated with the service using the broadcast mode.

The transmission component 804 may transmit an indication of whether the UE is receiving information associated with the service using the multicast mode or the broadcast mode.

The reception component 802 may receive an indication of whether the UE should receive the information associated with the service using the multicast mode or the broadcast mode.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
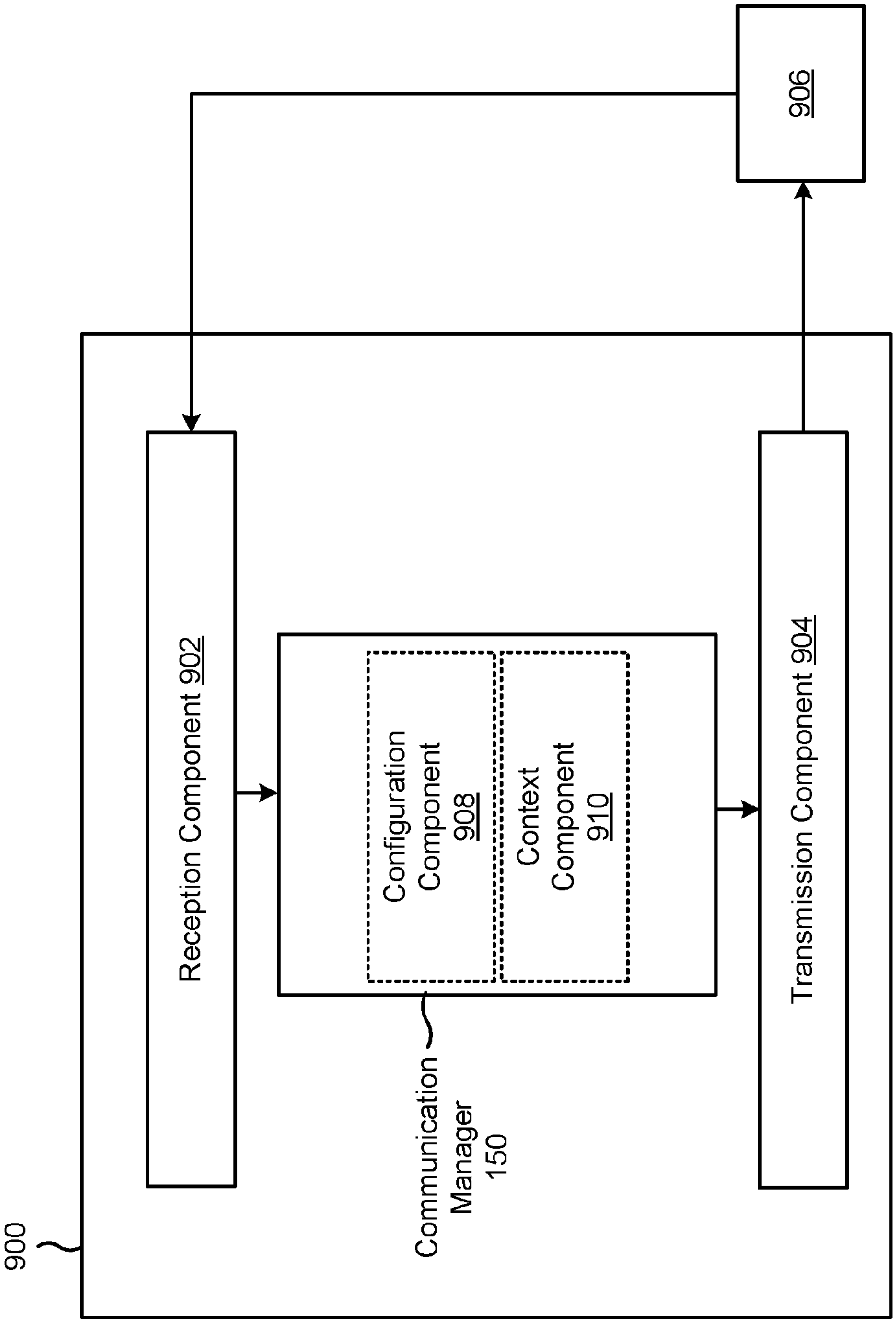
FIG. 9 is a diagram of an example apparatus for wireless communication, in accordance with the present disclosure.

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 150. The communication manager 150 may include one or more of a configuration component 908 or a context component 910, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The transmission component 904 may transmit a configuration associated with a service, the configuration indicating a first set of one or more parameters for accessing the service in a multicast mode using NAS based signaling, and a second set of one or more parameters for accessing the service in a broadcast mode within a broadcast service area. The transmission component 904 may transmit information associated with the service using the multicast mode. The transmission component 904 may transmit information associated with the service using the broadcast mode.

The configuration component 908 may configure a single multicast radio bearer for the multicast mode and the broadcast mode.

The reception component 902 may receive, from a UE, an indication of whether the UE is using the multicast mode or the broadcast mode.

The transmission component 904 may transmit, to a UE, an indication of whether the UE should use the multicast mode or the broadcast mode.

The context component 910 may store a context associated with the multicast mode, in a deactivated state, until no UEs are receiving the information associated with the service using the multicast mode, and a timer has expired.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station (BS), a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 10:
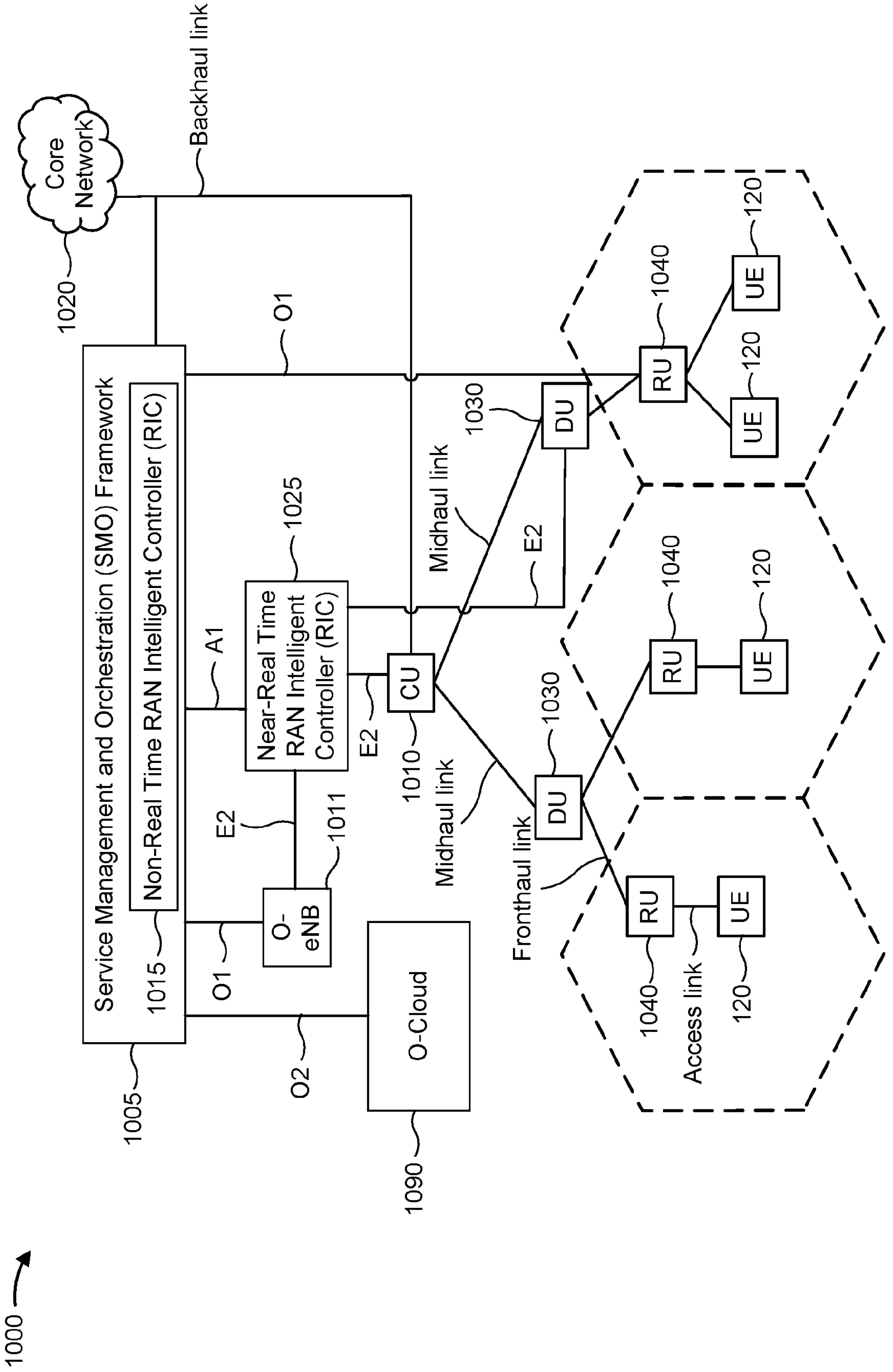
FIG. 10 is a diagram illustrating an example disaggregated base station architecture, in accordance with the present disclosure.

FIG. 10 is a diagram illustrating an example disaggregated base station architecture 1000, in accordance with the present disclosure. The disaggregated base station architecture 1000 may include a CU 1010 that can communicate directly with a core network 1020 via a backhaul link, or indirectly with the core network 1020 through one or more disaggregated control units (such as a Near-RT RIC 1025 via an E2 link, or a Non-RT RIC 1015 associated with a Service Management and Orchestration (SMO) Framework 1005, or both). A CU 1010 may communicate with one or more DUs 1030 via respective midhaul links, such as through F1 interfaces. Each of the DUs 1030 may communicate with one or more RUs 1040 via respective fronthaul links. Each of the RUs 1040 may communicate with one or more UEs 120 via respective radio frequency (RF) access links. In some implementations, a UE 120 may be simultaneously served by multiple RUs 1040.

Each of the units, including the CUS 1010, the DUs 1030, the RUs 1040, as well as the Near-RT RICs 1025, the Non-RT RICs 1015, and the SMO Framework 1005, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 1010. The CU 1010 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1010 can be logically split into one or more CU-UP units and one or more CU-CP units. A CU-UP unit can communicate bidirectionally with a CU-CP unit via an interface, such as the El interface when implemented in an O-RAN configuration. The CU 1010 can be implemented to communicate with a DU 1030, as necessary, for network control and signaling.

Each DU 1030 may correspond to a logical unit that includes one or more base station functions to control the operation of one or more RUs 1040. In some aspects, the DU 1030 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1030 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 1030, or with the control functions hosted by the CU 1010.

Each RU 1040 may implement lower-layer functionality. In some deployments, an RU 1040, controlled by a DU 1030, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1040 can be operated to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable each DU 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements, which may be managed via an operations and maintenance interface (such as an O1 interface). For virtualized network elements, the SMO Framework 1005 may be configured to interact with a cloud computing platform (such as an open cloud (O-Cloud) platform 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040, non-RT RICs 1015, and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with each of one or more RUs 1040 via a respective O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources. Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via an O1 interface) or via creation of RAN management policies (such as A1 interface policies).

As indicated above, FIG. 10 is provided as an example. Other examples may differ from what is described with regard to FIG. 10.

The following provides an overview of some Aspects of the present disclosure:

Aspect 1: A method of wireless communication performed by a user equipment (UE), comprising: receiving a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area; receiving information associated with the service using one of the multicast mode or the broadcast mode based at least in part on the first set of one or more parameters or the second set of one or more parameters; and switching to receiving information associated with the service using the other of the multicast mode or the broadcast mode based at least in part on the first set of one or more parameters or the second set of one or more parameters.

Aspect 2: The method of Aspect 1, further comprising joining a multicast session associated with the multicast mode using the NAS-based signaling.

Aspect 3: The method of any of Aspects 1-2, wherein the UE is authorized or authenticated prior to receiving the information associated with the service using the multicast mode.

Aspect 4: The method of any of Aspects 1-3, wherein the first set of one or more parameters comprises an identifier associated with the multicast mode and an indication of an area associated with the multicast mode, and the second set of one or more parameters comprises an identifier associated with the broadcast mode and an indication of the broadcast service area.

Aspect 5: The method of any of Aspects 1-4, wherein the configuration includes a session type indicator that indicates that the service is available via both the multicast mode and the broadcast mode.

Aspect 6: The method of any of Aspects 1-5, wherein the configuration includes a first session type indicator associated with the multicast mode and a second session type indicator associated with the broadcast mode.

Aspect 7: The method of any of Aspects 1-6, further comprising determining, based at least in part on the UE being in the broadcast service area, to receive the information associated with the service using the broadcast mode.

Aspect 8: The method of Aspect 7, further comprising receiving the information associated with the service using an identifier associated with the broadcast mode, and disabling the receiving of information having an identifier associated with the multicast mode.

Aspect 9: The method of Aspect 7, further comprising determining that the UE is no longer in the broadcast service area, wherein switching to the other of the multicast mode or the broadcast mode comprises switching to the multicast mode based at least in part on determining that the UE is no longer in the broadcast service area.

Aspect 10: The method of any of Aspects 1-9, further comprising determining a quality of a communication using the multicast mode or the broadcast mode, wherein switching to the other of the multicast mode or the broadcast mode is based at least in part on the quality of the communication using the multicast mode or the broadcast mode.

Aspect 11: The method of Aspect 10, wherein the quality of the communication using the multicast mode or the broadcast mode is determined based at least in part on a packet error rate, a block error rate, a reference signal received power, or a reference signal received quality of the communication.

Aspect 12: The method of Aspect 1, further comprising determining, based at least in part on one or more of the first set of one or more parameters, to receive the information associated with the service using the multicast mode.

Aspect 13: The method of Aspect 12, further comprising receiving the information associated with the service using an identifier associated with the multicast mode, and disabling the receiving of information having an identifier associated with the broadcast mode.

Aspect 14: The method of Aspect 12, further comprising determining that the UE has moved into the broadcast service area, wherein switching to the other of the multicast mode or the broadcast mode comprises switching to the broadcast mode based at least in part on determining that the UE has moved into the broadcast service area.

Aspect 15: The method of Aspect 14, further comprising maintaining a context associated with the multicast mode, until an expiration of a timer, after switching to the broadcast mode.

Aspect 16: The method of any of Aspects 1-15, further comprising: receiving a group paging message associated with the multicast mode; and transmitting an indication that the UE is receiving the information associated with the service using the broadcast mode.

Aspect 17: The method of any of Aspects 1-16, wherein the configuration indicates a single multicast radio bearer for the multicast mode and the broadcast mode.

Aspect 18: The method of any of Aspects 1-17, further comprising transmitting an indication of whether the UE is receiving information associated with the service using the multicast mode or the broadcast mode.

Aspect 19: The method of any of Aspects 1-18, further comprising receiving an indication of whether the UE should receive the information associated with the service using the multicast mode or the broadcast mode.

Aspect 20: A method of wireless communication performed by a network node, comprising: transmitting a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area; transmitting information associated with the service using the multicast mode; and transmitting information associated with the service using the broadcast mode.

Aspect 21: The method of Aspect 20, wherein transmitting the information associated with the service using the multicast mode includes transmitting the information using a point-to-point transmission mode or a point-to-multipoint transmission mode of a multicast radio bearer.

Aspect 22: The method of any of Aspects 20-21, wherein transmitting the information associated with the service using the broadcast mode includes transmitting the information using a multicast radio bearer or a multimedia broadcast multicast service control channel.

Aspect 23: The method of any of Aspects 20-22, wherein transmitting the information associated with the service using the multicast mode includes transmitting the information using a dedicated radio resource control message or a multicast radio bearer associated with a point-to-point transmission or a point-to-multipoint transmission.

Aspect 24: The method of any of Aspects 20-23, further comprising configuring a single multicast radio bearer for the multicast mode and the broadcast mode.

Aspect 25: The method of any of Aspects 20-24, wherein the multicast mode supports at least one of a handover or a Layer 2 retransmission of the service using a point-to-point transmission.

Aspect 26: The method of any of Aspects 20-25, further comprising receiving, from a UE, an indication of whether the UE is using the multicast mode or the broadcast mode.

Aspect 27: The method of any of Aspects 20-26, further comprising transmitting, to a UE, an indication of whether the UE should use the multicast mode or the broadcast mode.

Aspect 28: The method of any of Aspects 20-27, further comprising storing a context associated with the multicast mode, in a deactivated state, until no UEs are receiving the information associated with the service using the multicast mode, and a timer has expired.

Aspect 29: An apparatus for wireless communication at a device, comprising a processor; memory coupled with the processor; and instructions stored in the memory and executable by the processor to cause the apparatus to perform the method of one or more of Aspects 1-19.

Aspect 30: A device for wireless communication, comprising a memory and one or more processors coupled to the memory, the one or more processors configured to perform the method of one or more of Aspects 1-19.

Aspect 31: An apparatus for wireless communication, comprising at least one means for performing the method of one or more of Aspects 1-19.

Aspect 32: A non-transitory computer-readable medium storing code for wireless communication, the code comprising instructions executable by a processor to perform the method of one or more of Aspects 1-19.

Aspect 33: A non-transitory computer-readable medium storing a set of instructions for wireless communication, the set of instructions comprising one or more instructions that, when executed by one or more processors of a device, cause the device to perform the method of one or more of Aspects 1-19.

Aspect 34: An apparatus for wireless communication at a device, comprising a processor; memory coupled with the processor, and instructions stored in the memory and executable by the processor to cause the apparatus to perform the method of one or more of Aspects 20-28.

Aspect 35: A device for wireless communication, comprising a memory and one or more processors coupled to the memory, the one or more processors configured to perform the method of one or more of Aspects 20-28.

Aspect 36: An apparatus for wireless communication, comprising at least one means for performing the method of one or more of Aspects 20-28.

Aspect 37: A non-transitory computer-readable medium storing code for wireless communication, the code comprising instructions executable by a processor to perform the method of one or more of Aspects 20-28.

Aspect 38: A non-transitory computer-readable medium storing a set of instructions for wireless communication, the set of instructions comprising one or more instructions that, when executed by one or more processors of a device, cause the device to perform the method of one or more of Aspects 20-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and one or more processors, coupled to the memory, configured to:

receive a configuration associated with a service, the configuration indicating a first set of one or more parameters for accessing the service in a multicast mode using non-access stratum (NAS) based signaling, and a second set of one or more parameters for accessing the service in a broadcast mode within a broadcast service area, wherein the first set of one or more parameters comprises an identifier associated with the multicast mode and an indication of an area associated with the multicast mode, and the second set of one or more parameters comprises an identifier associated with the broadcast mode and an indication of the broadcast service area;

receive information associated with the service using one of the multicast mode or the broadcast mode based at least in part on the first set of one or more parameters or the second set of one or more parameters; and switch to receiving information associated with the service using the other of the multicast mode or the broadcast mode based at least in part on the first set of one or more parameters or the second set of one or more parameters.

2. The apparatus of claim 1, wherein the one or more processors are further configured to join a multicast session associated with the multicast mode using the NAS-based signaling.

3. The apparatus of claim 1, wherein the UE is authorized or authenticated prior to receiving the information associated with the service using the multicast mode.

4. The apparatus of claim 1, wherein the configuration includes a session type indicator that indicates that the service is available via both the multicast mode and the broadcast mode.

5. The apparatus of claim 1, wherein the configuration includes a first session type indicator associated with the multicast mode and a second session type indicator associated with the broadcast mode.

6. The apparatus of claim 1, wherein the one or more processors are further configured to determine, based at least in part on the UE being in the broadcast service area, to receive the information associated with the service using the broadcast mode.

7. The apparatus of claim 6, wherein the one or more processors are further configured to receive the information associated with the service using an identifier associated with the broadcast mode, and disabling the receiving of information having an identifier associated with the multicast mode.

8. The apparatus of claim 6, wherein the one or more processors are further configured to determine that the UE is no longer in the broadcast service area, wherein switching to the other of the multicast mode or the broadcast mode comprises switching to the multicast mode based at least in part on determining that the UE is no longer in the broadcast service area.

9. The apparatus of claim 1, wherein the one or more processors are further configured to determine a quality of a communication using the multicast mode or the broadcast mode, wherein switching to the other of the multicast mode or the broadcast mode is based at least in part on the quality of the communication using the multicast mode or the broadcast mode.

10. The apparatus of claim 9, wherein the quality of the communication using the multicast mode or the broadcast mode is determined based at least in part on a packet error rate, a block error rate, a reference signal received power, or a reference signal received quality of the communication.

11. The apparatus of claim 1, wherein the one or more processors are further configured to determine, based at least in part on one or more of the first set of one or more parameters, to receive the information associated with the service using the multicast mode.

12. The apparatus of claim 11, wherein the one or more processors are further configured to receive the information associated with the service using an identifier associated with the multicast mode, and disabling the receiving of information having an identifier associated with the broadcast mode.

13. The apparatus of claim 11, wherein the one or more processors are further configured to determine that the UE has moved into the broadcast service area, wherein switching to the other of the multicast mode or the broadcast mode comprises switching to the broadcast mode based at least in part on determining that the UE has moved into the broadcast service area.

14. The apparatus of claim 13, wherein the one or more processors are further configured to maintain a context associated with the multicast mode, until an expiration of a timer, after switching to the broadcast mode.

15. The apparatus of claim 1, wherein the one or more processors are further configured to:

receive a group paging message associated with the multicast mode; and transmit an indication that the UE is receiving the information associated with the service using the broadcast mode.

16. The apparatus of claim 1, wherein the configuration indicates a single multicast radio bearer for the multicast mode and the broadcast mode.

17. The apparatus of claim 1, wherein the one or more processors are further configured to transmit an indication of whether the UE is receiving information associated with the service using the multicast mode or the broadcast mode.

18. The apparatus of claim 1, wherein the one or more processors are further configured to receive an indication of whether the UE should receive the information associated with the service using the multicast mode or the broadcast mode.

19. An apparatus for wireless communication at a network node, comprising:

a memory; and one or more processors, coupled to the memory, configured to:

transmit a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area, wherein the first set of one or more parameters comprises an identifier associated with the multicast mode and an indication of an area associated with the multicast mode, and the second set of one or more parameters comprises an identifier associated with the broadcast mode and an indication of the broadcast service area;

transmit information associated with the service using the multicast mode; and transmit information associated with the service using the broadcast mode.

20. The apparatus of claim 19, wherein the one or more processors, to transmit the information associated with the service using the multicast mode, are configured to transmit the information using a point-to-point transmission mode or a point-to-multipoint transmission mode of a multicast radio bearer.

21. The apparatus of claim 19, wherein the one or more processors, to transmit the information associated with the service using the broadcast mode, are configured to transmit the information using a multicast radio bearer or a multimedia broadcast multicast service control channel.

22. The apparatus of claim 19, wherein the one or more processors, to transmit the information associated with the service using the multicast mode, are configured to transmit the information using a dedicated radio resource control message or a multicast radio bearer associated with a point-to-point transmission or a point-to-multipoint transmission.

23. The apparatus of claim 19, wherein the one or more processors are further configured to configure a single multicast radio bearer for the multicast mode and the broadcast mode.

24. The apparatus of claim 19, wherein the multicast mode supports at least one of a handover or a Layer 2 retransmission of the service using a point-to-point transmission.

25. The apparatus of claim 19, wherein the one or more processors are further configured to receive, from a UE, an indication of whether the UE is using the multicast mode or the broadcast mode.

26. The apparatus of claim 19, wherein the one or more processors are further configured to transmit, to a UE, an indication of whether the UE should use the multicast mode or the broadcast mode.

27. The apparatus of claim 19, wherein the one or more processors are further configured to store a context associated with the multicast mode, in a deactivated state, until no UEs are receiving the information associated with the service using the multicast mode, and a timer has expired.

28. A method of wireless communication performed by a user equipment (UE), comprising:

receiving a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area, wherein the first set of one or more parameters comprises an identifier associated with the multicast mode and an indication of an area associated with the multicast mode, and the second set of one or more parameters comprises an identifier associated with the broadcast mode and an indication of the broadcast service area;

receiving information associated with the service using one of the multicast mode or the broadcast mode based at least in part on the first set of one or more parameters or the second set of one or more parameters; and switching to receiving information associated with the service using the other of the multicast mode or the broadcast mode based at least in part on the first set of one or more parameters or the second set of one or more parameters.

29. A method of wireless communication performed by a network node, comprising:

transmitting a configuration associated with a service, the configuration indicating a first set of one or more parameters for accessing the service in a multicast mode using non-access stratum (NAS)-based signaling, and a second set of one or more parameters for accessing the service in a broadcast mode within a broadcast service area, wherein the first set of one or more parameters comprises an identifier associated with the multicast mode and an indication of an area associated with the multicast mode, and the second set of one or more parameters comprises an identifier associated with the broadcast mode and an indication of the broadcast service area;

transmitting information associated with the service using the multicast mode; and transmitting information associated with the service using the broadcast mode.

* * * * *